United States Patent
Seufert

(10) Patent No.: US 8,108,113 B2
(45) Date of Patent: Jan. 31, 2012

(54) APPARATUS AND METHOD FOR PREVENTING INCORRECT GEAR SHIFTS IN AUTOMATIC TRANSMISSIONS OF MOTOR VEHICLES

(75) Inventor: Martin Seufert, Steinheim (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 18 days.

(21) Appl. No.: 12/847,973

(22) Filed: Jul. 30, 2010

(65) Prior Publication Data

US 2011/0010061 A1    Jan. 13, 2011

Related U.S. Application Data

(63) Continuation of application No. PCT/EP2009/000609, filed on Jan. 30, 2009.

(30) Foreign Application Priority Data

Feb. 1, 2008   (DE) .................. 10 2008 008 065

(51) Int. Cl.
*F16H 59/14* (2006.01)
*F16H 61/16* (2006.01)
(52) U.S. Cl. ............... 701/62; 701/51; 701/53; 477/78; 477/125; 180/338
(58) Field of Classification Search .................. 701/53, 701/62; 477/80; 180/338
See application file for complete search history.

(56) References Cited

U.S. PATENT DOCUMENTS 7,606,649 B2 * 10/2009 Sato ............................. 701/54
2003/0158645 A1    8/2003 Czarnecki et al.

FOREIGN PATENT DOCUMENTS

| DE | 10 2006 007 666 A1 | 9/2007 |
| EP | 0 802 354 | 10/1997 |
| WO | WO 01/49094 A1 | 7/2001 |
| WO | WO 01/62537 A1 | 8/2001 |

OTHER PUBLICATIONS

International Search Report; PCT/EP2009/000609; Filed Feb. 1, 2008.
English Translation of International Preliminary Report on Patentability; International Appl. No. PCT/EP2009/000609.

* cited by examiner

*Primary Examiner* — Thomas Black
*Assistant Examiner* — Lin B Olsen
(74) *Attorney, Agent, or Firm* — Knobbe, Martens, Olson & Bear, LLP

(57) ABSTRACT

A method (42) for preventing incorrect gear shifts in automatic transmissions (14) of motor vehicles comprising the following steps: determining a current output torque ($M_{is}$) of a source gear ($G_{SOURCE}$); generating a history of output torques by storing the current output torque in the source gear ($G_{SOURCE}$) for a time interval having a predetermined duration; determining an absolute value of a minimal output torque ($M_{min}$) and an absolute value of a maximum output torque ($M_{max}$) from the history (60) of output torques, comparing the two values and determining the greater absolute value; determining (S3) an absolute value of a target torque ($M_{TARGET}$) of a target gear ($G_{TARGET}$), if an instruction for a gear change exists; comparing (S4) the absolute value of the target torque ($M_{TARGET}$) with the greater absolute value; and shifting (S5) the transmission (14) from the source gear ($G_{SOURCE}$) to the target gear ($G_{TARGET}$), if the absolute value of the target torque ($M_{TARGET}$) is less than or equal to the greater absolute value (FIG. 2).

9 Claims, 3 Drawing Sheets

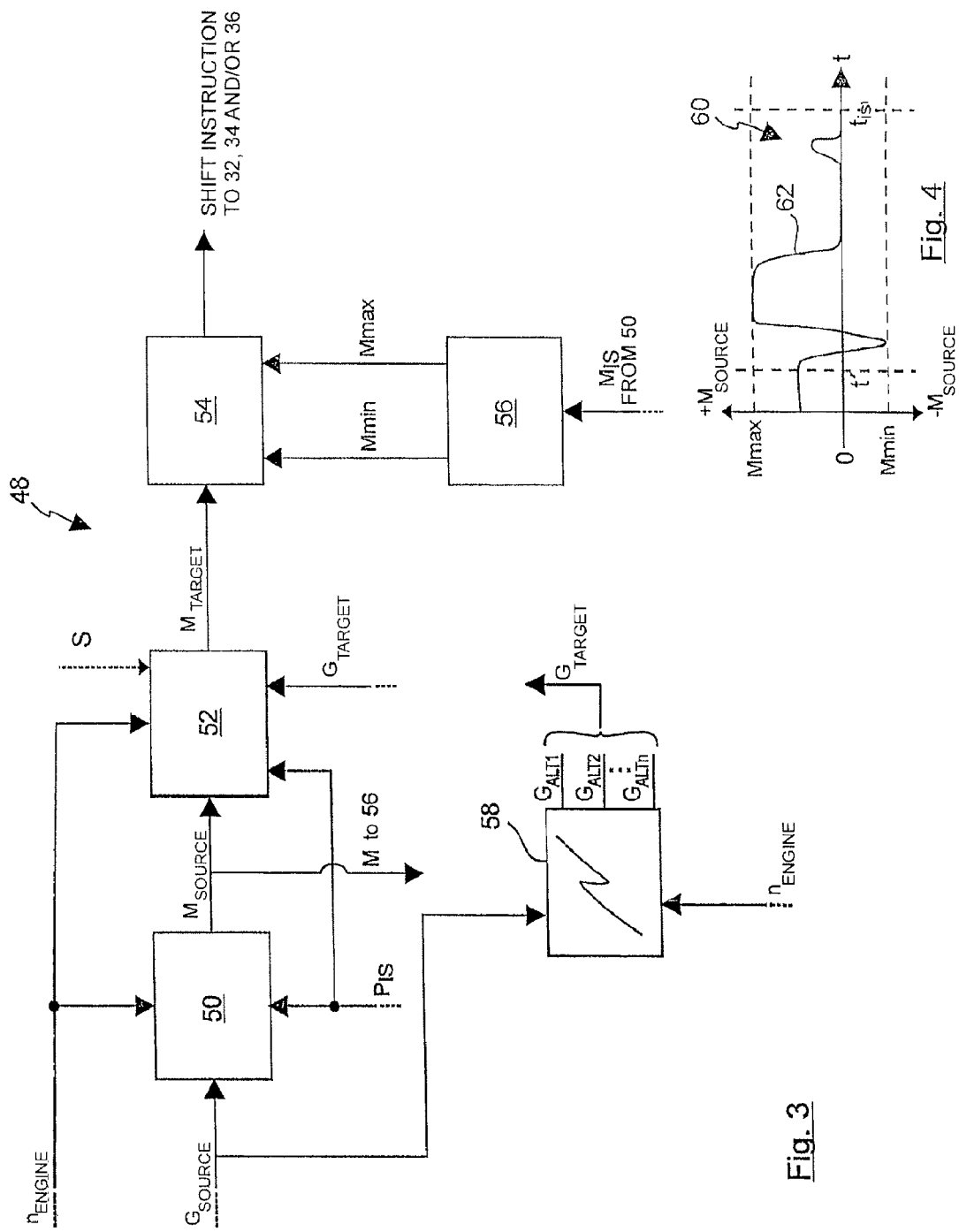

APPARATUS AND METHOD FOR PREVENTING INCORRECT GEAR SHIFTS IN AUTOMATIC TRANSMISSIONS OF MOTOR VEHICLES

RELATED APPLICATIONS

This is a continuation application of the co-pending International application PCT/EP2009/000609 (WO 2009/095250 A1) filed on 30 Jan. 2009 which claims priority of the German patent application DE 10 2008 008 065 A1 filed on 1 Feb. 2008, which is fully incorporated herewith by reference.

BACKGROUND OF THE INVENTION

The present invention relates to a system and a method for preventing incorrect gear shifts with automatic transmissions so that dangerous, instable traveling conditions due to slip do not occur. In particular, with motor vehicles having high torque, instable conditions can occur due to, for example, repeatedly changing road inclinations or significantly different grip conditions. These conditions are to be avoided. Prevention of incorrect gear shifts can be used particularly in the field of twin-clutch transmissions.

RELATED PRIOR ART

Twin-clutch transmissions comprise two parallel partial transmissions (branches), each of which has assigned its own friction clutch (running dry or wet).

The input members of the friction clutches are connected to a drive unit, such as a combustion engine. However, the drive unit can also be an electric motor or a hybrid-drive unit. Uneven transmission stages (1, 3, 5 . . . ) are assigned to one of the partial transmissions. The even transmission stages (2, 4, 6 . . . ) are assigned to the other partial transmission. The transmission of drive power from the drive unit to driven wheels of a motor vehicle generally happens via one of the two partial transmissions. As a rule, one transmission stage is pre-selected in the respective non-active partial transmission. Change of gears from the start gear of the active partial transmission to the target gear of the non-active partial transmission can then happen by overlapping of the actuation of the friction clutches at the input side. At the same time, the overlapping actuation can be performed such that traction is not interrupted during the change of gears.

As a rule, the corresponding controlling of the friction clutches and the engaging and disengaging of gear stages happens in an automated manner, namely by means of a superordinated control unit. Further, this control unit can be connected to a control unit dedicated to the drive unit. In this context, it is clear that the control unit selects the torque being transmitted through the respective friction clutches and the transmission ratios being set in the respective partial transmissions so that they are adapted to the current traveling situation (velocity of the vehicle, traction operation or overrun, etc.).

High demands on safety are to be made with automatic and automated transmissions of motor vehicles.

The document DE 100 08 66 5A1 discloses a method for controlling drive systems of a motor vehicle. In particular when automatic transmissions are used, creeping in the plane, rolling backwards at the hill, as well as oscillating shifts shall be avoided. For this purpose, data is used, such as the velocity of the vehicle, distance, position, trajectories, traffic density, frictional connection of the tires, information from active signs, traffic lights, etc. An anticipatory shifting strategy is discussed.

The document DE 199 62 963 A1 discloses a method for regulating engine speed during a shifting process. For this purpose, means are provided for developing a nominal RPM of the vehicle engine dependent on a synchronization RPM of a transmission ratio which is to be adjusted anew (gear change). Beside this, based on a current engine speed, a current engine torque, a history of engine torques being deposited in a torque memory, and the dynamics of a torque build-up is determined by means of a prediction device, wherein RPM is output by the prediction device which probably arises at the end of a prediction horizon.

The document DE 10 2006 007 666 A1 shows fields of characteristic lines for gear changes.

SUMMARY OF THE INVENTION

This object is solved by a method for preventing incorrect gear shifts in automatic transmissions of motor vehicles, the method comprising the following steps: determining a current output torque of a source gear; generating a history of output torques by storing the current output torque of the source gear for a time interval having a predetermined duration; determining an absolute value of a minimal output torque and an absolute value of a maximum output torque from the history of output torques, comparing these two absolute values and determining the greater absolute value; determining a target torque of the target gear, if a gear change instruction exists; comparing the absolute value of the target torque with the greater absolute value; and shifting the transmission from the source gear to the target gear, if the absolute value of the target torque is less than or equal to the greater absolute value.

Contrary to the prior art, where slip could only be recognized at the drive wheels when it was already present, since the prior-art systems have determined slip by comparison between the RPM of the drive axle and the non-driven axle, the present invention prevents the slip already before it happens. In accordance with the present invention it is not necessary to actually execute the shifting instruction. In accordance with the present invention it is possible that the decision, whether a gear change is actually executed, is made dependent in advance on whether a slip is expected to occur. Thus, the vehicle does not get into a dangerous situation at all which, in the worst case, cannot be averted and results in an accident.

The method of the present invention is capable of considering current conditions (dry road, wet road, ice, snow, etc.) when preventing incorrect gear shifts. For this purpose, suitable measuring values of the past are stored for a predetermined period of time, and are overwritten continuously in cycles.

In accordance with a preferred embodiment, a target gear is not shifted to, if the absolute value of the torque is greater than the absolute value of the maximum output torque.

In this case, an inadmissibly high output torque would be transmitted to the target gear. The output torque in the target gear would be higher than any output torque applied within the previous period of time. Experience of life indicates that a driver always adapts to the current conditions. If the conditions are difficult, e.g., if the road is wet, then it is to be presumed that the output torques applied are less high than those that would be applied, if the road were dry. If the calculation of the output torque in the target gear results in a higher value than the one applied up to now, then the probability that slip occurs at the drive wheels is high. Safety is remarkably increased by preventing a gear shift in this situation.

Further it is advantageous, if it is checked whether the shifting process from the source gear to the desired target gear is admissible in dependence on the engine speed.

In this step it is checked whether the desired gear shift is actually possible. As a rule, a change such as from the 6th gear to the 1st gear, should not be possible.

Even further, it is preferred if the target gear(s) is (are) determined in advance by evaluating a corresponding field of characteristic lines.

Shifting processes which are possible as a matter of principle can be determined easily on the basis of the source gear in dependence on the engine speed. By determining possible target gears in advance, the corresponding torques can be determined in parallel so that the calculation of the output torques for each of the (admissible) target gears can only performed in parallel before the desired instruction for a shift in process is received. This results in time savings so that actually desired shifting processes can be performed more quickly.

With another embodiment at least one disturbing quantity, in particular shifting hysteresis, is considered when determining the target torque.

Even further, it has been found advantageous, if the history of output torques comprises values which reach from a current point in time to a predetermined point in time in the past and which are updated permanently.

In this manner it is possible to gain information from the past for predicting statements on the future behavior of the vehicle when applying desired output torques.

Additionally, it is advantageous if the determination of target torques is initiated by a shifting instruction which is either output by a driver or a central control.

The object is further solved by a system for preventing incorrect gear shifts in automatic transmissions of motor vehicles, wherein the system comprises:
- a device for determining a current output torque of a source gear;
- means for generating a history of output torques, wherein the current output torque in the source gear is stored for a time interval having a predetermined duration ($t_{is}$-t');
- means for determining an absolute value of a minimal output torque and an absolute value of a maximum output torque from the history of output torques in order to compare these absolute values with each other and to determine the greater one thereof;
- a device for determining an absolute value of a target torque of a target gear, if an instruction for a gear change exists;
- a comparison device for comparing the absolute value of the target torque with the greater value and for outputting a shift instruction in order to shift the transmission from the source gear to the target gear, if the absolute value of the target torque is less than or equal to the greater absolute value.

It is clear that the above-mentioned and hereinafter still to be explained features are not only applicable in the respectively given combination but also in other combinations or alone without departing from the scope of the present invention.

BRIEF DESCRIPTION OF THE DRAWINGS

Embodiments of the invention are illustrated in the figures and will be explained in more detail in the following description, wherein:

FIG. 3 shows a system in accordance with the present invention;
and
FIG. 4 shows a history of output torques.

PREFERRED EMBODIMENTS OF THE INVENTION

Figure 1:
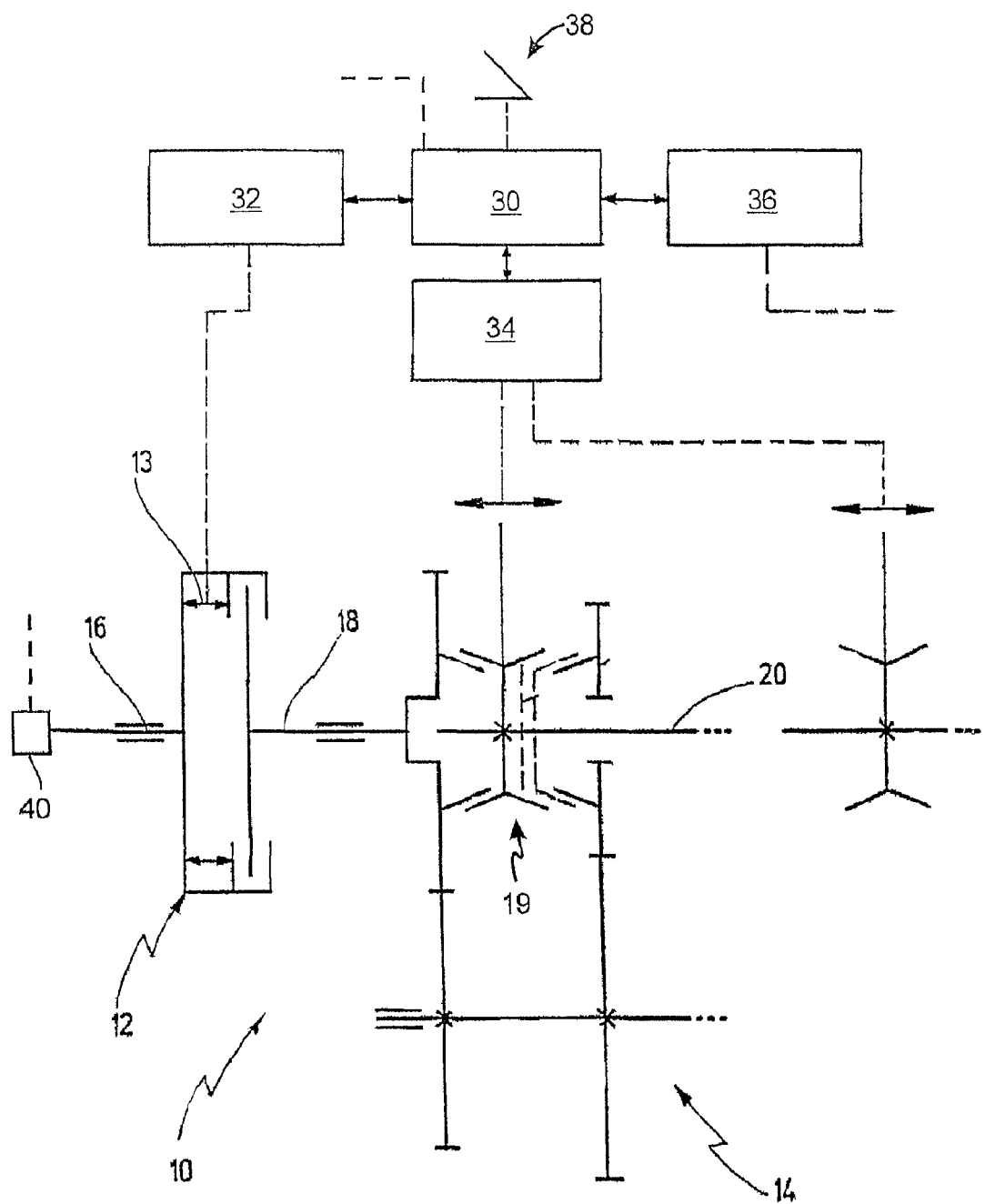
FIG. 1 shows a schematic drivetrain of a motor vehicle.

A (simple) drivetrain of a motor vehicle is generally shown at 10 in FIG. 1.

The drivetrain 10 comprises a friction clutch 12, acting as a separation clutch or start-up clutch, and a step-variable transmission 14. Although a simple step-variable transmission is shown here, the invention which is hereinafter explained can also be applied to twin-clutch transmissions.

The separation clutch 12 is a friction clutch which can be actuated by means of a clutch actuator 13. In closed position, the separation clutch 12 connects an engine output shaft 16 in a frictionally engaging manner to an input shaft 18 of the transmission 14. In open position, the two shafts 16 and 18 are separated from each other. The separation clutch 12 passes a drag phase during the opening and closing of the separation clutch. On this occasion, two elements of the separation clutch 12 having different speeds are engaging with each other in a frictional manner. At the so-called "drag point", the clutch actuator 13 has moved the two clutch elements, which are rotating at different speeds just close enough together that a predefined drag torque is transmitted from the engine output shaft 16 to the transmission drive shaft 18. In this case, the clutch elements still rotate at different speeds.

The step-variable transmission 14 transmits the power of the engine of the motor vehicle from the transmission input shaft 18, i.e. the drive shaft 18 to the transmission output shaft 20, i.e. the output shaft 20. The transmission 13 comprises a plurality of gear sets. Each gear set comprises at least two gear wheels. A shifting clutch is arranged between the gear sets at the output shaft 20 in terms of a synchronization device 19. The synchronization device can, while a gear is engaged, reduce differences in RPM to zero between the output shaft 20 and the gear wheel, to which the output shaft is to be connected, thus synchronizing the two transmission components.

The motor vehicle having the drivetrain 10 integrated further comprises a central control 30, a clutch control 32, a transmission control 34, and an engine control 36. The central control 30 can be connected additionally to the accelerator pedal 38 as well as an engine RPM counter 40. The central control 30 is also connected to the clutch control 32, the transmission control 34 and the engine control 36, and coordinates control tasks thereof. It is clear that the elements shown in FIG. 1 as individual controls can be implemented as software, wherein the single controls 32, 34, and 36 can each form individual program modules of a total control program.

Incorrect gear shifts or unintentional shifts with automatic or automated transmissions can lead to critical traveling situations, since, due to the incorrect shifts, a much too high or low output torque is transmitted to the wheels. One example for such a case would be the shifting down from the fourth gear to the second gear, in particular, for example, if the road is wet. In this situation, the drive wheels can block, if a lower gear had been shifted to. In particular, this can be problematic for rear-wheel driven vehicles, for example, if a shifting process from the fourth gear to the second gear is performed on the highway during an overtaking maneuver including a changing of lanes. If the wheels block during the change of lanes, the vehicle can break out laterally.

Much too high drive torques or brake torques can lead to positive or negative slip at the drive wheels, thereby causing the vehicle to become unstable.

Such incorrect gear shifts can either be triggered by an error in the system (e.g. in the central control 30) or by the driver (wrong shifting). If the engine speed lies in an admissible range during, i.e. after, an incorrect gear shift, i.e. if the engine speed is admissible in both the source gear and the target gear, the shifting process cannot be prevented due to the ratio between the engine speeds alone.

Figure 2:
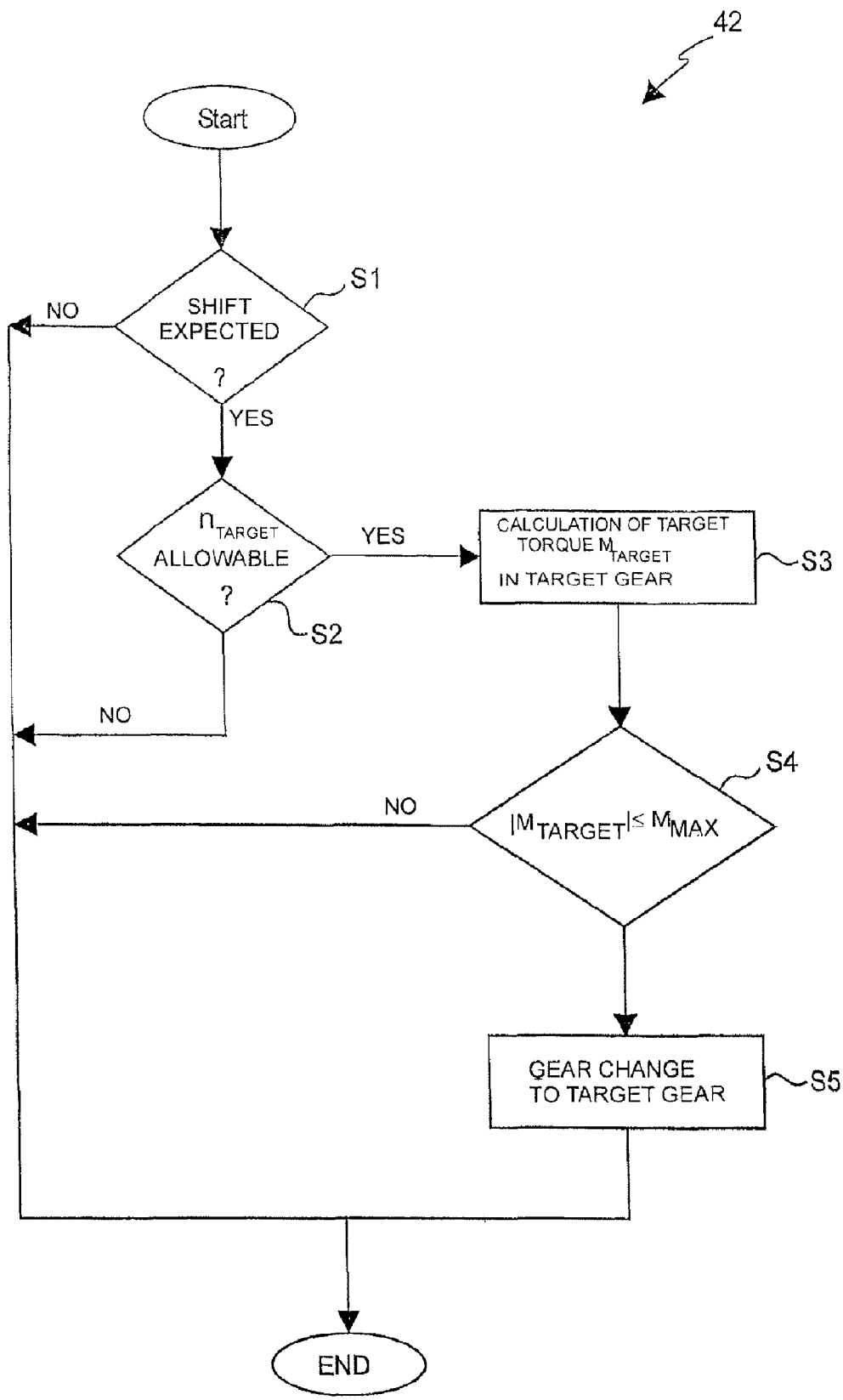
FIG. 2 shows a flow chart of the method in accordance with the present invention.

With reference to FIG. 2, the method in accordance with the present invention for preventing incorrect gear shifts is hereinafter explained.

In a first step S1, the method 42 of the present invention determines whether a shifting process is to be expected, i.e.

whether a gear is to be selected due to an instruction of the central control 30 or due to a shifting instruction by the driver. If a shift is to happen, then the shift shall take place from a source gear $G_{SOURCE}$ to a target gear $G_{TARGET}$. Consequently, when shifting back from the fourth gear to the second gear, hence the fourth gear would represent the source gear $G_{SOURCE}$ and the second gear would represent the target gear $G_{TARGET}$.

Once it has been determined that a shifting process will happen, in a second step S2, it is checked whether the engine speed in the target gear $G_{TARGET}$ is in the admissible range. As explained above, the transmission 14 is connected via the friction clutch 12 to the drive unit, i.e. the engine. Since the transmission ratio between the source gear $G_{SOURCE}$ and the target gear $G_{TARGET}$ is known, the engine speed can be determined, i.e. calculated, easily when the current engine speed in the source gear is known.

If the engine speed in the target gear is outside of an admissible range, no gear shift will happen. However, if the engine speed $n_{engine}$ in the target gear is within the admissible range, an output torque $M_{TARGET}$ in the target gear is calculated in a step S3. For this purpose, input, such as the position of the accelerator pedal 38, angle of a throttle valve, the target gear, the current engine speed, etc. is considered.

In a step S4 the target torque $M_{TARGET}$ calculated in this manner, i.e. the absolute value thereof, is compared with a minimal output torque $M_{min}$ or a maximum output torque $M_{max}$, dependent on which of the two torques is greater with regard to its absolute value. It is clear that the comparison does not need to be done with both values, but can also happen separately in each case, based on only one of the values. However, this is dependent on whether this is regarded as a shifting up during acceleration or overrun, or shifting down during acceleration or overrun.

However, the comparison is preferably done on the basis of the higher one of the two values $M_{min}$ and $M_{max}$. The values $M_{min}$ and $M_{max}$ are retrieved from a memory, which is overwritten in cycles, and contains a history of output torques for a predetermined period of time (such as 5 to 10 seconds). Subsequently, it is compared which of the two values is greater with regard to the absolute value thereof. The absolute value of the greater value is used as basis for the comparison with the absolute value of the target torque $M_{TARGET}$. In FIG. 2 the absolute value of the greater torque is designated by the $|M_{max}|$ for the sake of simplification. A more detailed description will be given below with reference to FIGS. 3 and 4.

If step S4 determines that the absolute value of the target torque lies in an admissible range of output torques between the values $M_{min}$ and $M_{max}$, or is less than the absolute value of the greater maximum torque, the gear change from the source gear $G_{SOURCE}$ to the target gear $G_{TARGET}$ happens. Otherwise, no shifting process happens.

It is clear that the output torque can also be a braking torque, wherein with a braking torque it may need to be considered that the same acts on all of the wheels, whereas drive torques merely act on the drive wheels. With a braking torque, the determination of the maximum torque at a wheel or an axle is desirable.

The method in accordance with the present invention also allows preventing a slip before it happens at the wheel. The method of the present invention can also be used with all-wheel-drive systems. Incorrect gear shifts are recognized before the engagement of the gear. It is particularly advantageous if the application of the method in accordance with the invention happens at shifting-back processes during acceleration, because in this case incorrect gear shifts can only be mastered with difficulty by the driver.

With reference to FIG. 3, a system 48 is shown that prevents incorrect gear shifts by calculating the output torque in the target gear and comparing it to output torque threshold values $M_{min}$ and $M_{max}$ or the absolute value of the higher torque in terms of absolute value, which is obtained from the history of output torques.

The system 48 can be integrated in the central control 30 or can be provided separately. It is clear that the system 48 can be implemented both as hardware and as software.

The system 48 comprises a first calculation unit 50 for determining an output torque (drive torque or acceleration torque) at the wheels or drive wheels of a motor vehicle. For this purpose, the calculation unit 50 is supplied with a number of inputs, such as the engine speed $n_{engine}$, an indication of the currently engaged gear, i.e. the source gear $G_{SOURCE}$, information on the current position $P_{is}$ of the accelerator pedal 38, and so on. Alternatively or additionally, also information on a position of the throttle valve, the vehicle velocity, vehicle acceleration, or similar can be supplied to the calculation unit 50. The first calculation unit 50 determines an output torque $M_{SOURCE}$ (overrun torque, acceleration torque) in the source gear based on these parameters.

The information on the output torque $M_{SOURCE}$ in the source gear is supplied to a second calculation unit 52. The second calculation unit 52 also receives information on the current engine speed $n_{engine}$. Another input for the second calculation unit 52 is the indication of the source gear $G_{SOURCE}$. The second calculation unit can also take into account disturbances S, such as shifting hysteresis, which is shown in FIG. 3 by means of a dashed line. It is clear that the above quantities mentioned in connection with the first calculation unit 50 can also represent inputs of the second calculation unit 52. Also, the calculation unit 50 could be unified with the calculation unit 52.

Particularly if the transmission ratio between the source gear and the target gear is known, the second calculation unit 52 calculates, based on these input variables, an output torque (overrun torque or acceleration torque) $M_{TARGET}$ in the target gear and provides this information to a comparison unit 54.

The comparison unit 54 compares the (calculated) output torque $M_{TARGET}$, i.e. its absolute value, with a minimal output torque $M_{min}$ and/or a maximum output torque $M_{max}$ (cf. step S4 of FIG. 2), i.e. its absolute value, for deciding whether actually a shifting instruction for a gear change to the target gear (cf. step S5) can be output to the control devices responsible for the gear change.

The comparison unit 54 gets the comparison values $M_{min}$ and $M_{max}$ from a memory device 56. The memory device 56 gets information on the current output torques $M_{is}$ in the source gear, i.e. via $M_{SOURCE}$, from the calculation unit 50. The memory device 56 generates a history 60 of output torques, as schematically shown in FIG. 4, from these current output torques $M_{is}$.

In FIG. 4, the output torque $M_{SOURCE}$ is depicted over time. Positive values of the output torque M (in the source gear) represent acceleration torques. Negative values of the output torque M represent overrun torques. Overrun torques occur, for example, if a driver takes his foot from the accelerator pedal 38 and the vehicle rolls, particularly downhill. Acceleration torques are present, if, for example, the driver "accelerates", i.e. if the vehicle is accelerated by means of the engine power.

In FIG. 4 an exemplary course 62 of the output torque for a certain time period, starting at a current point in time $t_{is}$ up to a predetermined point in time t' in the past, is shown. It can be seen that the course 62 comprises, at the beginning, positive output torques which subsequently decrease to the negative region in order to finally increase again to the positive region. Then a phase follows during which the output torque is almost zero in order to change back briefly to the positive region. During the interval of $t_{is}$-t' the course 62 passes a minimal output torque $M_{min}$ and a maximal output torque $M_{max}$. In FIG. 4 these maximum values are shown by horizontal dashed lines. The time limits t' and $t_{is}$ are illustrated by means of vertical dashed lines. The values $t_{is}$, $t'$, $M_{min}$ and $M_{max}$ define an information window containing information that is essential for the comparison unit 54 (FIG. 3).

The period of time of the window can be selected freely and can lie in the range of several seconds, while torque values are detected in a discrete or continuous manner. The memory unit 56 is provided with means suitable for extracting the extreme values $M_{max}$ and $M_{min}$.

The history of output torques supplies information on the traveling behavior for a predetermined time period in the past. Thus, one indirectly obtains also a guide number for the friction value between tires and road. At wet road conditions, the course 62 looks different than at dry road conditions. At dry road conditions, higher output torques can be transmitted without resulting in slip.

For example, the last 60 traveling seconds can be considered. The greatest acceleration torque was, for example, 500 Nm, whereas the "greatest" overrun torque was only −10 Nm. If the target torque $M_{TARGET}$ is compared with the absolute value of the greater one of the two values, i.e. with an absolute value of 500 Nm, then shifting processes under overrun would also be allowed at e.g. −300 Nm, though the "greater" overrun torque was only −10 Nm. Alternatively, this shift could also be prohibited, since the smallest torque used was "only" −10 Nm. In this case, one might also prohibit many practical and technically useful shifting processes so that a comparison with the absolute value of the greater one of the two values is preferred.

From the history of output torques, the system 48 can hence derive which output torques can be transmitted and which cannot be transmitted. If the output torque $M_{TARGET}$ in the target gear should be greater with respect to its absolute value than the absolute value of the extreme value $M_{min}$ or $M_{max}$, then the likelihood that slip will occur is relatively high. The comparison unit 54 decides in such cases that the requested shifting process will not be carried out, thereby excluding slip. However, if the calculated output torque $M_{TARGET}$ in the target gear is within the range, which is defined by the two extreme values $M_{min}$ and $M_{max}$, i.e. by the absolute value of the greater one of the two values, then it can be precluded that there will be slip in the target gear. Then the comparison unit 54 outputs a shifting instruction.

Thus it is possible to determine before the execution of a shifting process whether or not slip is present.

Instead of the output torque, also other references could be detected, such as vehicle acceleration. Instead of the output torque $M_{TARGET}$ in the target gear, then the acceleration in the target gear would be calculated.

Further, in FIG. 3 an other calculation unit 58 is shown by which the different allowable target gears $G_{TARGET}$ are determined on the basis of the source gear $G_{SOURCE}$. The unit 58 outputs a number of alternatively admissible target gears $G_{ALT1}$, $G_{ALT2}$, $G_{ALTn}$. The engine speed is supplied as input so that the alternatively possible target gears can be determined on the basis of known characteristic lines.

It is clear that the input $G_{TARGET}$ for the calculation unit 52 can be the result of both a shifting request of the driver and a shifting instruction of the central control 30.

Although the comparison of absolute values is a relatively elegant procedure, it is also possible to compare absolute values of the different torques with each other.

I claim:

1. A method for preventing incorrect gear shifts in automatic transmissions of motor vehicles, comprising the following steps:
   determining a current output torque of a source gear;
   generating a history of output torques by storing the current output torque of the source gear for a time interval having a predetermined duration;
   determining an absolute value of a minimum output torque and a maximum output torque from the history of output torques, and comparing the two absolute values and determining which of the two absolute values is the greater one;
   determining a target torque of the target gear if an instruction for a gear change exists;
   comparing the absolute value of the target torque with the greater one of the absolute values; and
   shifting the transmission from the source gear to the target gear if the absolute value of the target torque is less than or equal to the greater absolute value.

2. The method of claim 1, wherein the shifting to the target gear is not performed, if the absolute value of the target torque is greater than the absolute value of a maximum output torque ($M_{max}$).

3. The method of claims 1, wherein it is additionally checked whether the shifting process from the source gear to the desired target gear is allowable in dependence on the engine speed ($n_{engine}$).

4. The method of claim 3, wherein the target gear is determined in advance by evaluating a corresponding field of characteristic lines.

5. The method of claim 1, wherein the determination of the target torque at least one disturbance is taken into account.

6. The method of claim 5, wherein the one disturbance comprises shifting hysteresis.

7. The method of claim 1, wherein the history of output torques comprises values which are permanently updated, reaching from a current point in time up to a predetermined point in time in the past.

8. The method of claim 1, wherein the determination of the target torque is initiated by a shifting instruction which is output by one of the driver and a control.

9. System for preventing incorrect gear shifts in automatic transmissions of motor vehicles, comprising:
   a device for determining a current output torque of a source gear;
   a device for generating a history of output torques, wherein the current output torque of the source gear is stored for a time interval having a predetermined duration;
   a device for determining an absolute value of a minimal output torque and an absolute value of a maximum output torque from the history of output torques, for comparing these absolute values with each other and for determining the greater absolute value;
   a device for determining an absolute value of a target torque of a target gear, if an instruction for a gear change exists;
   a comparison unit for comparing the absolute value of the target torque with the greater absolute value, and for outputting a shifting instruction in order to shift the transmission from the source gear to the target gear, if the absolute value of the target torque is less than or equal to the greater absolute value.

* * * * *